United States Patent
Klemenz

(10) Patent No.: US 10,558,473 B2
(45) Date of Patent: Feb. 11, 2020

(54) EXTENSIBILITY SUPPORT FOR AN APPLICATION OBJECT FRAMEWORK

(71) Applicant: SAP SE, Walldorf (DE)

(72) Inventor: Oliver Klemenz, Sinsheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/589,534

(22) Filed: May 8, 2017

(65) Prior Publication Data

US 2018/0321954 A1    Nov. 8, 2018

(51) Int. Cl.
G06F 9/44 (2018.01)
G06F 9/445 (2018.01)
G06F 9/448 (2018.01)

(52) U.S. Cl.
CPC ........ *G06F 9/44521* (2013.01); *G06F 9/4488* (2018.02)

(58) Field of Classification Search
CPC .................................................. G06F 9/44521
USPC ........................................................ 717/121
See application file for complete search history.

(56) References Cited

U.S. PATENT DOCUMENTS

| 5,414,812 A * | 5/1995 | Filip ........................ G06F 9/465 707/694 |
| 2010/0161648 A1* | 6/2010 | Eberlein ................ G06F 9/4488 707/769 |
| 2012/0174064 A1* | 7/2012 | Polly ....................... G06Q 10/10 717/120 |
| 2014/0181786 A1* | 6/2014 | Alanis ................. G06F 11/3624 717/106 |

* cited by examiner

*Primary Examiner* — Wei Y Zhen
*Assistant Examiner* — Lanny N Ung
(74) *Attorney, Agent, or Firm* — Mintz Levin Cohn Ferris Glovsky and Popeo, P.C.

(57) ABSTRACT

An application object framework provides a developer with an ability to provide customers with an ability to add custom extension data and an associated generic extension mechanism(s). Accordingly, each customer may be provided with an ability, e.g., to use its own data structures and data definitions to define desired data, and support persistence and process integration thereof. Further, each customer may be enabled to make such extension data available on a corresponding graphical user interface (GUI), e.g., including read/write access using the GUI, in a manner defined by each customer.

18 Claims, 6 Drawing Sheets

EXTENSIBILITY SUPPORT FOR AN APPLICATION OBJECT FRAMEWORK

TECHNICAL FIELD

This description relates to extensibility support for an application object framework.

BACKGROUND

There are many different approaches for providing software applications and/or related functionalities. For example, in some paradigms, a client interfaces with an application server executing application code, and the application server interfaces with a database to store, access, or manipulate application data.

Some applications are written and constructed using application objects. Such application objects may contain relevant data, as well as logic and rules for processing data, or for interfacing with other application objects, or otherwise providing desired software functionality.

As the application objects are generally discrete and potentially specific to associated contexts, there may be inefficiencies related to using such application objects. For example, it may be undesirably necessary to repeat a single function or aspect across each of a plurality of application objects, which may lead to redundant and inefficient development efforts on the part of application object developers.

A software application may be developed and sold to a plurality of purchasers/customers, each of which may have specialized needs or requirements with respect to the software application. It is difficult or impossible for a software provider to provide the software application with all the features necessary to meet all of these needs or requirements. Moreover, the needs or requirements of a customer may change over time.

SUMMARY

Techniques are provided for enabling an application object framework (AOF) that is flexible, efficient, and easy to use, with respect to both developing and implementing extensions to the AOF and specific, included software applications. The application object framework can be implemented directly in the context of a database system, such as an in-memory database system, so as to enable direct access to needed data. The application object framework enables both core and custom actions associated with a potentially large number of application objects, so that software developers do not have to implement such actions individually and repetitively for newly-developed or modified application objects.

The described AOF supports development of a software application(s) that will be desired by a potentially large pool of purchasers/customers wishing to implement the functions of the supported software application(s). The software provider may attempt to anticipate and service the most prominent or most important uses cases for the software application(s) being provided, including techniques for maintaining and storing necessary or desired data. Nonetheless, such data (and associated techniques for processing such data) may be highly specific to individual domains of individual customers. Consequently, it is impractical or impossible for the software provider to anticipate and predefine all relevant use cases for all potential customers.

In some implementations, the application object framework provides a developer with an ability to provide customers with an ability to add custom extension data and an associated generic extension mechanism(s). Accordingly, each customer may be provided with an ability, e.g., to use its own data structures and data definitions to define desired data, and support persistence and process integration thereof. Further, each customer may be enabled to make such extension data available on a corresponding graphical user interface (GUI), e.g., including read/write access using the GUI, in a manner defined by each customer.

The details of one or more implementations are set forth in the accompanying drawings and the description below. Other features will be apparent from the description and drawings, and from the claims.

DETAILED DESCRIPTION

Figure 1:
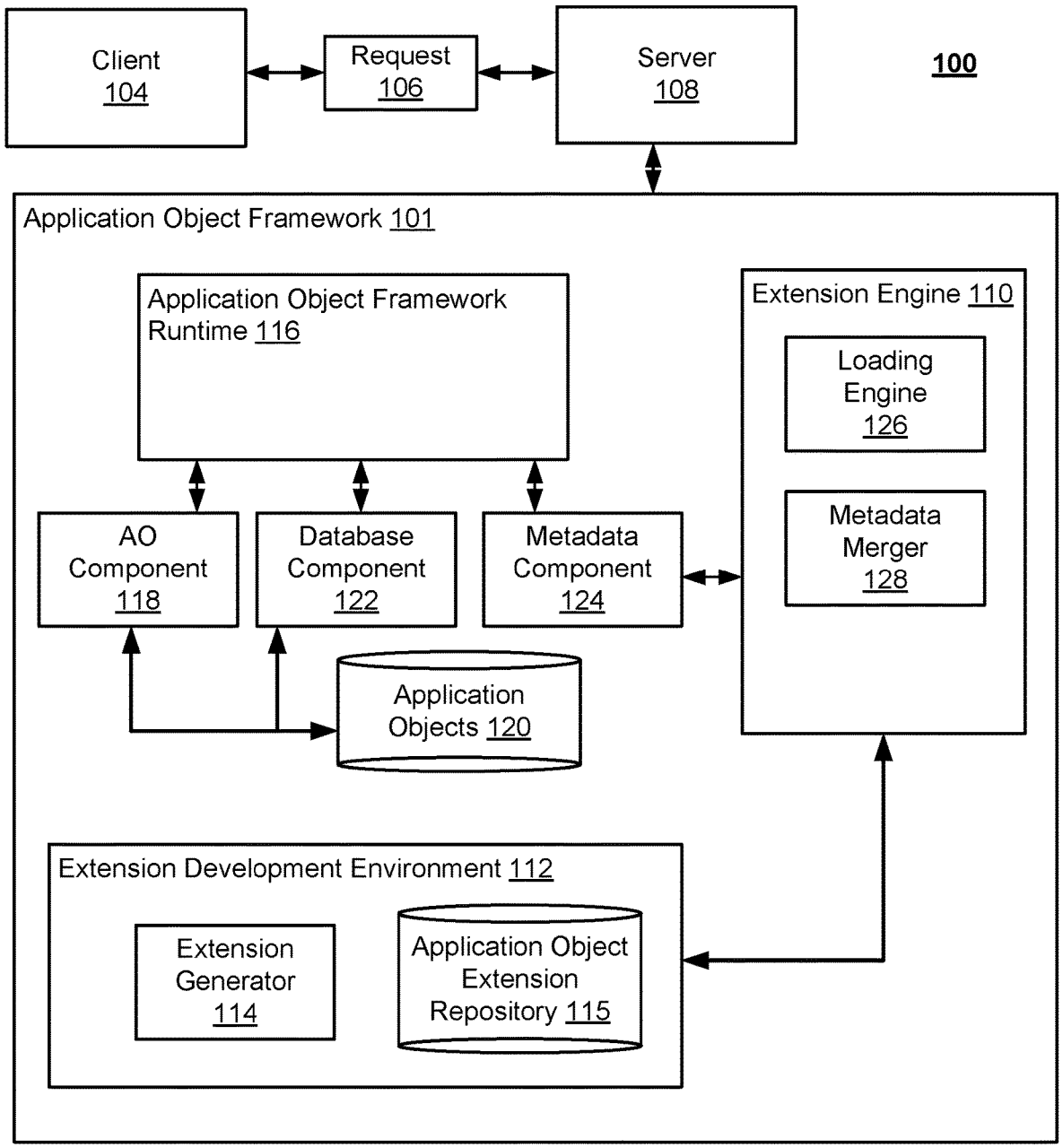
FIG. 1 is a block diagram of a system for extensibility support for an application object framework.

FIG. 1 is a block diagram of a system 100 that includes an application object framework (AOF) 101 utilized to implement a client 104 providing a software application(s) to a customer. As described in detail, below, the client 104 is operable to send a request 106, and to otherwise operate and interact with, a server 108 (and thereby with any associated databases), in a manner that leverages features of the AOF 101. The client 104 may be providing in a standard form and with standard features by a provider of the AOF 101, yet may also be easily updated and extended by a customer or other user, in order to meet needs and desires that are particular to each such customer/user.

As referenced above, the AOF 101 may provide such software applications through the use of pre-configured application objects 120, examples of which are provided below, or would be apparent. The AOF 101 also includes an extension engine 110, which may be supported in operation by an extension development environment 112. More specifically, the extension development environment 112 may include an extension generator 114 that is configured to extend selected ones of the application objects 120 to obtain application object extensions stored within an application objects extension repository 115.

In the example of FIG. 1, application objects of the application objects repository 120 may contain relevant application data, as well as logic and rules for processing data, or for interfacing with other application objects, or otherwise providing desired software functionality. Such application objects provide a number of known conveniences and advantages with respect to the development and execution of software applications.

In the non-limiting example of FIG. 1, the application object framework 101 includes an application object component 118 that interacts with stored application objects 120, e.g., in conjunction with a database component 122. The database component 122 may be used to provide database management and access features with respect to the application objects 120. Further, a metadata component 124 may be utilized to provide metadata and associated schemas designed to govern runtime operations of corresponding application objects (e.g., or types or instances thereof) in the context of an application object framework runtime 116.

In some implementations, the application objects 120 may be stored in appropriate database tables of a database system, so that the application object data should be accessed in a manner that is appropriate for the database system being used. For example, in some implementations, such a database system may include the high performance analytic appliance ("HANA") system as developed by SAP SE of Waldorf, Germany.

In the specific, non-limiting example of FIG. 1, the application object component 118 may be configured, perhaps in conjunction with the database component 122, to load a specific application object from the application objects 120. The loaded application object may thus be enabled for execution by way of a runtime interface that is provided by the application object framework runtime 116, in conjunction with corresponding metadata obtained from the metadata component 124.

More particularly, for example, the application object component 118 may load a library corresponding to a requested application object, including its definition, structure, attribute, action, checks, or determinations. Metadata obtained from the metadata component 124 may include a corresponding metadata schema that provides information regarding metadata definitions associated with the requested application object. In this way, for example, metadata that may be common to a structure, configuration, or operation of a plurality of application objects may be repeatedly utilized in conjunction with each of a plurality of corresponding application objects when generating a runtime interface in the context of the application object framework runtime 116.

Thus, the AOF 101 enables a software application developer in the context of the system 100 to develop or update a software application (such as a software application that includes, or utilizes, the client 104). It would be inefficient or infeasible for such a developer to develop software in a manner that requires the developer to create and/or configure basic application and/or network-related functionalities. Accordingly, the application object framework 101 may be designed to provide a software developer with many such basic functions/features, so that the software developer may focus on providing new, specialized features that are specific to the application being developed.

The AOF 101, in general, facilitates points of interface, e.g., between a client and an application server, or between an application server and a database. As the application objects are generally discrete and potentially specific to associated contexts, the AOF 101 creates efficiencies related to using such application objects. For example, the AOF 101 may facilitate repeating a given function or aspect across each of a plurality of application objects, which may lead to efficient development efforts on the part of application object developers. Moreover, the AOF 101 may facilitate interfacing of individual application objects with each other, or with other local or remote software, in a flexible and complete manner.

In a simplified example for the system 100 of FIG. 1, explained in more detail below, an application object may include a sales order within a business software application. The sales order, at the level of the application object, may be associated with related metadata. The sales order application object may be instantiated to obtain a sales order instance, which itself may be associated with additional metadata.

For example, a sales order application object may be associated with metadata characterizing specific fields or data thereof, such as when a field is characterized as describing a maximum (or minimum) order. A particular instance may thus have more particular metadata, such as when the maximum/minimum order is specified in terms of a count of items, or an amount of money. Of course, these are non-limiting examples provided for the sake of explanation and example, and the application object(s) may represent many other business documents, or other documents, or person, role, article, place, or any other item or entity that a software developer may wish to express as an application object.

In the example, then, a software developer may develop a software application, such as, for example, an inventory management solution, an enterprise resource planning application, a customer relationship management application, a human resources application, or a supply chain management application. Such an application might include the type of sales order application object just referenced, or any one or more of thousands of potential application objects.

A resulting software application may then be sold or provided to hundreds or thousands of customers. As already referenced, it is difficult or impossible to meet the particular needs of all such customers. For example, continuing the example of the sales order application object, it may occur that a standard version includes only a maximum value (price), while a particular customer may wish to also add a minimum value (or other parameter). Similarly, a particular type of data may be editable in a standard version of a software application, while a particular customer may wish that type of data to be read-only.

Therefore in FIG. 1, the client 104 represents both a point of interface for consumers of a provided software application, as well as an access point for administrators and other authorized users to interact with the extension development environment 112. In this way, the administrators and other authorized users may thereby develop one or more application object extensions in the repository 115 (i.e., for later use by the various consumers of the provided software application, e.g., within the same organization), to extend the standard functions and features of the provided software application.

In operation, e.g., in response to a request from the client 104, the application object component 118 may load a library corresponding to the requested application object, including the definition, structure, attributes, actions, checks, and determinations of the application object. The metadata component 124 may proceed to load corresponding metadata of the application object. The AOF runtime 116 may thus be provided with runtime application object(s) and metadata object(s), and may therefore be enabled to execute various operations using the relevant metadata definitions, including create, read, update, or delete (CRUD) operations with respect to the database component 122 and any underlying database(s) storing the application object(s). The AOF runtime 116 may utilize a library file to load definitions of the application object(s) in question, using the name of the application object(s). The application object(s) may be contained with a software package having a corresponding package name (referred to herein as a "core package").

The metadata component 124 may be configured to derive relevant metadata for an application object based on the underlying database tables. For example, a column name may correspond to an attribute name. Similarly, the attribute type, length, scale or other characteristic (e.g., mandatory or optional) may be derived.

The application object definition in a corresponding library file may include additional metadata that is not separately derivable from the database tables. The application object definition may be expressed in a text format, e.g., Javascript Object Notation (JSON), and/or using source code in a javascript implementation.

In the example of FIG. 1, the application object definition may be enhanced using related extension definitions (e.g., which may have the same or similar name(s) as the name(s) of the underlying application object(s)). These extension definitions may execute in a pre-defined sequence of layers, and included/defined within an extension package corresponding to the core package of the same application object. In this way, for example, a provider of a software application may ship a base or core implementation that can not be modified by the receiving customer using the client 104, while allowing the customer to develop the customer's own extension package that can be edited by the customer.

Some application objects may not be extendable. In these cases, extendable application objects may be designated as such, e.g., using an appropriate flag or other notifier. That is, at a given point in time, some application objects may be marked as extendable without actually currently being extended, while other application objects are extendable and extended (e.g., extension is enabled/activated), and some application objects are not extendable at all.

In the described implementations, the extension package layering just referenced may include specific sequences of extensions in which each package is built on top of another package as part of a package layering scheme, in which each layer has a unique sequence number. In this way, the customer may extend the available functionality, while not disrupting the underlying core functionality shipped by the provider. For example, the customer may add additional checks, such as when adding new actions (logic) to an application object that would not interfere with existing actions.

In operation, the extension generator 114 may be configured to add the types of extension data referenced above, and described herein, including various data types and associated labels, as well as definitions defining how and where extension data may be presented in a graphical user interface (GUI) of the client 104. Extension metadata may include properties defining how the extension data is handled or validated. The extension data definition and associated metadata information may be provided to the customer as a delivery unit.

After an extension is generated by the extension generator 114 and stored using the repository 115, it may occur that a request for a corresponding application object of the repository 120 is received. The application object component 118 may proceed to locate and load the requested application object, while the loading engine 126 of the extension engine 110 may check to see whether the requested application object is marked or flagged as being extensible.

If so, the loading engine 126 may proceed to retrieve a corresponding extension from the repository 115. During this loading, the loading engine 126 may derive and/or retrieve metadata for the extension.

A metadata merger 128 may then merge application object metadata together with application object extension metadata, including, e.g., performing any necessary checks or determinations. The merged metadata may then be used to provide a metadata runtime object to the AOF runtime 116, which may then render and otherwise provide the requested application object and extensions using the client 104.

The AOF 101, or any other application framework, may be implemented using a variety of techniques and configurations. For example, although illustrated as a separate, individual component, it will be appreciated that the server 108 may be implemented using one or more servers, which may individually or collectively be utilized to implement the application object framework 101, including, e.g., the application object framework runtime 116, and/or various other components, as described in detail by way of various non-limiting examples in the following description.

More generally, the various components of the system 100 of FIG. 1 are illustrated as separate, individual, discrete components, sometimes illustrated as being organized as sub-components of a larger component. However, as just referenced, it will be appreciated that any such individual component may represent two or more instances of the same component, and/or may be implemented as two or more sub-components of the illustrated component. Similarly, but conversely, it will be appreciated that two or more sub-components may be combined for implementation as a single component.

Moreover, where two or more instances of a single component are implemented, it will be appreciated that two or more of the various illustrated components may be implemented in different ones of the multiple instances, and that operations of a single component may be modified or enhanced to reflect interactions with the plurality of instances of each such component. For example, where a plurality of instances of (perhaps different types of) the server 108 are utilized, two or more elements of the smart control manager 102 may be implemented in two or more instances of the different servers.

Finally with respect to the simplified example of FIG. 1, the request 106 is illustrated and described as being received from the client 104. Of course, information and data may also be sent from the server 108 to the client 104, including a response to the request 106. For example, requested data may be sent, or a confirmation of completion of a requested database action may be sent.

Figure 2:
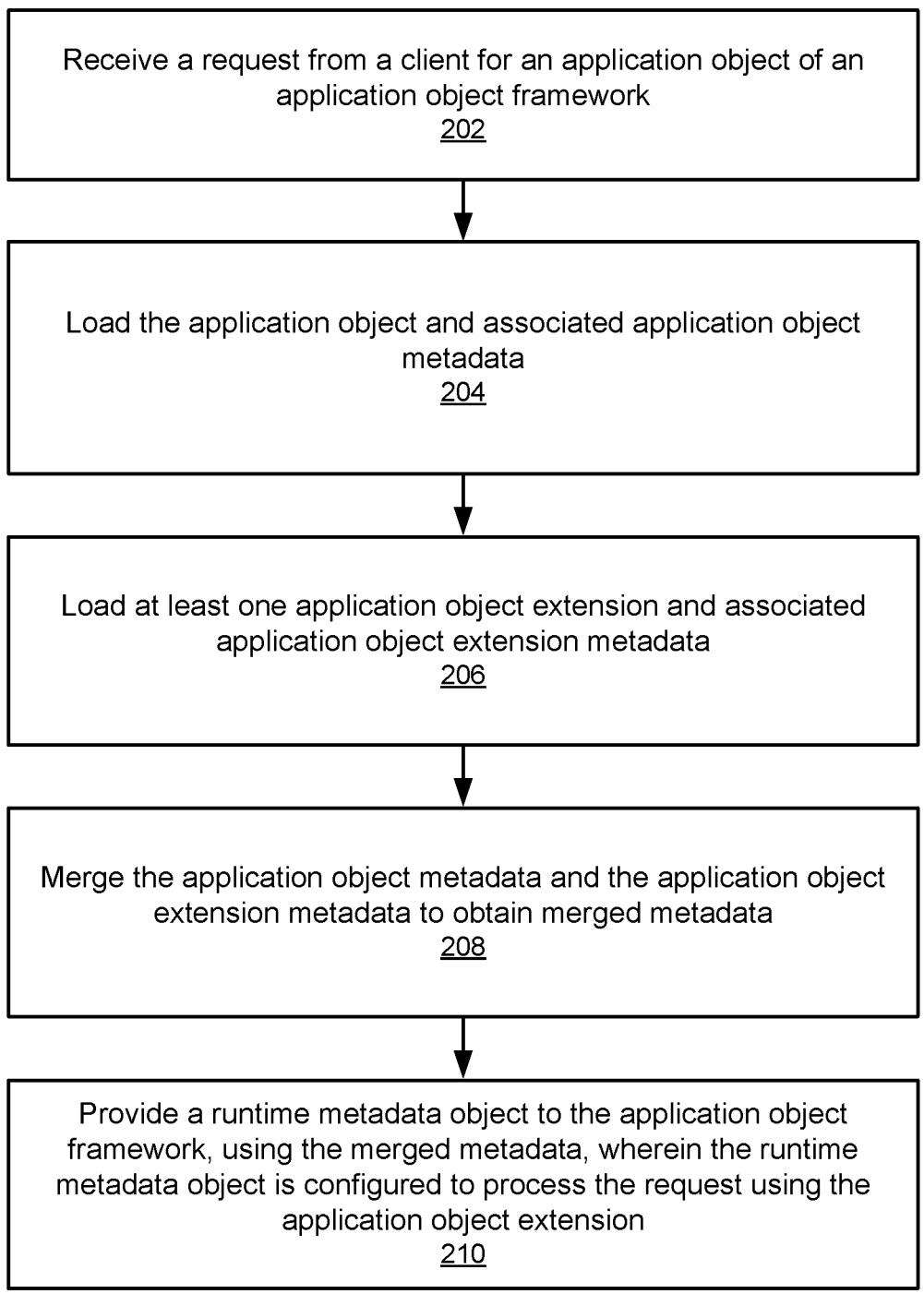
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations. In various additional or alternative implementations, one or more of the operations 202-210, or sub-operations thereof, may be performed in a different order than that illustrated, and/or one or more of the operations or sub-operations may be omitted. Further, any two or more of the various operations or sub-operations may be performed in a partially or completely overlapping or parallel manner, or in a nested, iterative, looped, or branched fashion.

In the example of FIG. 2, a request from a client for an application object of an application object framework may be received (202). For example, the extension engine 110 may receiving the request 106 from the client 104, e.g., via the AOF 101.

The application object and associated application object metadata may be loaded (204). For example, the AO component 118 may be configured to load the application object from the application objects 120. The metadata component 124 may be configured to derive the application object metadata from a table used to store the application object, and/or retrieve the application object metadata from a previously-stored memory.

At least one application object extension and associated application object extension metadata may be loaded (206).

For example, the loading engine 126 may be configured to load the application object extension from the repository 115. The application object extension metadata may be derived from a table used to store the application object extension, and/or retrieved from a previously-stored memory.

The application object metadata and the application object extension metadata may be merged to obtain merged metadata (208). For example, the metadata merger 128 may be configured to merge the application object metadata and the application object extension metadata. The merging may include, or be supplemented with, enhancing the merged metadata, and/or checking for consistency between the two types of metadata. The merging may be implemented according to merging criteria, such as, as described herein, ensuring that functionality of the application object (and associated core package) is either supplemented or enhanced, but not contradicted or prevented, by the additional functionality of the application object extension (and associated extension package).

A runtime metadata object may thus be provided to the application object framework, using the merged metadata, wherein the runtime metadata object is configured to process the request using the application object extension (210). For example, the extension engine 110, and/or metadata component 124 (e.g., the metadata processor 308 of FIG. 3) may be configured to provide the runtime metadata object to the AOF runtime 116 (e.g., the runtime processor 306). The runtime 116/306 may receive the metadata runtime object, along with the application object and the application object extension, and may proceed to utilize the metadata runtime object, and execute otherwise standard runtime operations for executing the application object/extension, in response to the request 106.

Figure 3:
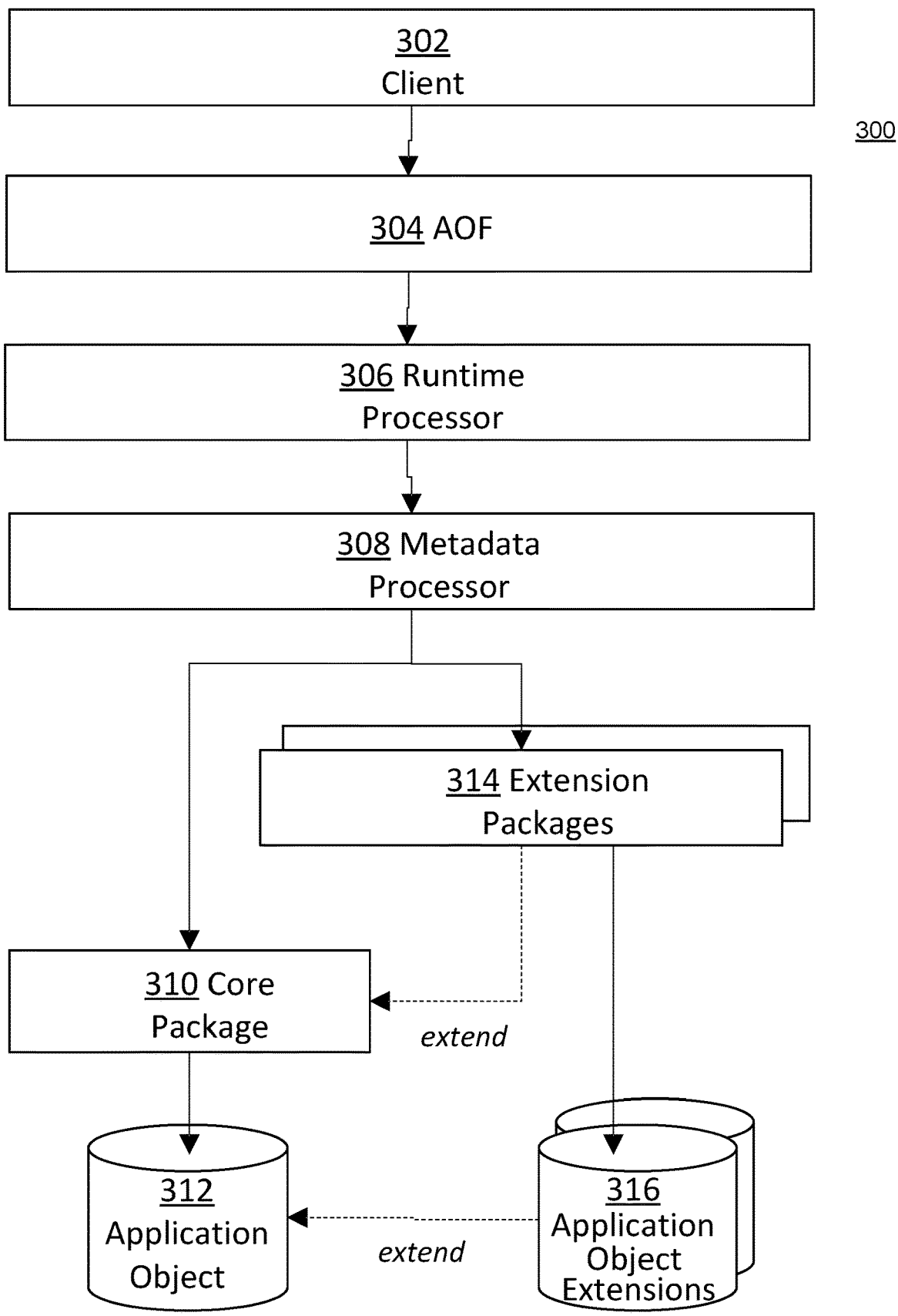
FIG. 3 is a block diagram of a system illustrating an example implementation of the system of FIG. 1.

FIG. 3 is a block diagram of a system 300 illustrating an example implementation of the system 100 of FIG. 1. In the example of FIG. 3, as referenced above, the application object framework 101 is implemented using the HANA system as developed by SAP SE of Waldorf, Germany, or similar or related in-memory or main memory database system. For example, the application object framework 101 may be implemented using the HANA platform and associated extended services ("XS") engine.

In some implementations, the application object framework 101 may be implemented and coded using a server-side Java Script language. In related, specific example implementations, the application object framework thus provides a persistency framework for java script/JSON (Java Script Object Notation) objects, e.g., implemented in a runtime environment such as node.js. In such examples, the application object framework thus provides the runtime for an object declaration file to model application objects, e.g., as aggregations of hierarchical nodes mapped to corresponding entities within database tables of the larger database system. Accordingly, as also referenced above, application logic of application objects may be described using determinations, checks, and actions to express relevant semantics, while associated metadata/properties may be used to describe corresponding structural representations.

Thus, in the example of FIG. 3, a client 302 is connected by way of the HTTP protocol to the server 108 (not shown as such within FIG. 3). The application object framework 304 may be connected to a corresponding HTTP routing mechanism, e.g., using the "express" module of node.js. For example, the client 302 may connect to the HTTP server 108 using a URL that addresses a resource on the server's application framework, e.g., a corresponding application object. Dispatching of a request, such as the request 106, may be based on a file extension of the included URL, as well as on a protocol type (e.g., here, HTTP).

As referenced above, and described in detail, below, AOF 101 provides a standardized process by which data is transferred from a UI to the backend, application logic is processed, and data is persisted. Standard protocols, such as HTTP and/or REST, as well as non-standard protocols (e.g., extension protocols), may be used. In FIG. 3, as in FIG. 1, the described extensibility of application objects provides an additional layer(s) of flexibility and control to the customer using the client 302. Specifically, the described standardized framework offers, for each designated application object and associated metadata, extensions and associated extension metadata information that can be processed by the runtime processor 306, the AOF 304, and ultimately by the customer(s) via the user interface 302.

In more detail, in FIG. 3 and in the following examples, it is assumed for the purposes of illustration and example that application object metadata is structured hierarchically, and available on multiple levels of the hierarchy. For example, at an application object level, root metadata may be made available.

Each object may include one or more nodes, and each node may be associated with one or more attributes. For example, and as already referenced with respect to FIG. 1, attributes may include a name(s), field(s), or other characterizations of included data or types of data.

Application object metadata also may include one or more associated actions. For example, an object may be associated with a database action, such as a create, read, write, or delete action.

Thus, the metadata may include information about the object itself, as well as metadata that is node-specific. As the application objects are structured as nodes, e.g., a deeply-structured tree of nodes, each node may hold its own metadata information. For example, one level may correspond at a table level, and one level below that may be column information. Each node at the column level may have attributes which map to a table, and these attributes may have metadata as well. The actions may include functionality of the application objects, which may enable execution of status changes, such as enhancing data, or formulating queries. For example, query metadata may enable bringing up a pop-up window to search for a different object, or establish a connection between two objects.

In the example of FIG. 1, a metadata processor 308, similar to the metadata component 124 and extension engine 110 of FIG. 1, is configured to interface with a core package 310 to access application object(s) 312. The metadata processor 308 is also configured to interface with an extension package(s) 314 to access application object extensions 316.

Thus, a particular application object, such as the sales order example above, may reside in the core package 310. This core package may be delivered to a customer and may be restricted from changes being made by the receiving customer.

Meanwhile, the application object may have a corresponding extension 316, and the customer may define the package extension 314 for the application object extension to reside in. Within the customer's layer(s), then, the customer may create the package extension 314 as a custom package extending the core package 310, and in which the customer may provide enhancements to the core package 310, including performing later edits to the extension/enhancements, as desired.

In practice, the customer may identify the extension package 314, and/or its included application object extension 316, as being associated with (e.g., extending) the corresponding core package 310 and application object 312. For example, the application object extension 316 may have a shared or same name as the application object 312 to identify the application object extension 316 as providing an extension to the corresponding core application object definition. For example, the customer may create the application object extension as a file within the extension package 314, and specify a corresponding extension definition.

Figure 4:
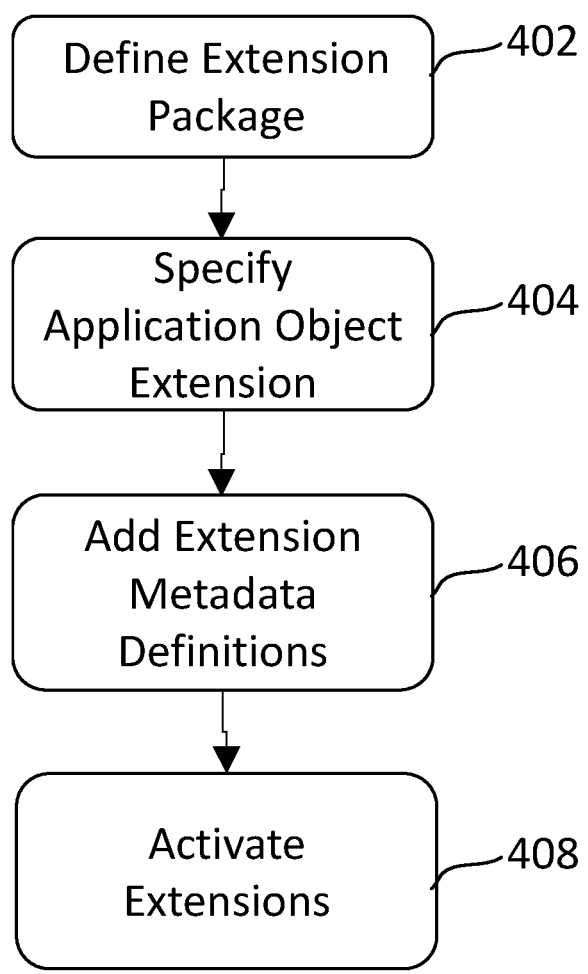
FIG. 4 is a flowchart illustrating example design-related operations associated with the system of FIG. 3.

FIG. 4 is a flowchart illustrating design-related operations associated with operation of the systems of FIGS. 1 and 3. In the example of FIG. 4, the customer may be permitted to create the extension package 314 (402). In so doing, the customer may specify the application object extension 316 (404) as a file with the same name, and include a definition using a definition language corresponding to the core definition language. That is, an extension definition may have a same or similar syntax as a normal application object definition, although with restrictions. In general, such restrictions may prevent the customer from changing the core definition(s) of the core package 312, while allowing additional requirements. For example, the extension may be permitted to require additional authorization(s) or enablement checks, or may permit the addition of new actions or nodes, while not allowing for the deletion of actions or nodes in the core package 310.

The customer may then add extension metadata definitions (406). For example, the extension metadata definitions may specify, for a corresponding application object and application object extension, a new node, a new attribute, a new function or action, or a new property.

For example, as in the example of the sales order application object referenced above, the customer may with to provide an application object extension to extend the sales order with a new node containing particular customer information or logic. Thus, the customer may create a sales order extension, specify a node extension to the root node, and specify a new attribute(s) in this extension.

Finally in FIG. 4, the created extensions may be activated (408). By requiring activation of application object extensions, it is possible to enable a corresponding, later de-activation. By providing the possibility of de-activation, it is possible to diagnose potential sources of error in the operations of the systems of FIGS. 1 and 3. For example, following a malfunction of the system of FIG. 3, it may be possible to de-activate one or more of the application object extensions 316. Then, if the system of FIG. 3 functions normally, an administrator may determine that the malfunction was caused, at least in part, by the de-activated extension. Conversely, if the system continues to experience the same malfunction, the administrator may deduce that the cause of the malfunction is in the core package 310/application object 312.

Although FIG. 4 illustrates a single iteration for adding and activating an extension, in practice, it is possible for the customer to add a plurality of extensions for a single application object. As described, these extensions may be added as ordered sequences of layers.

Figure 5:
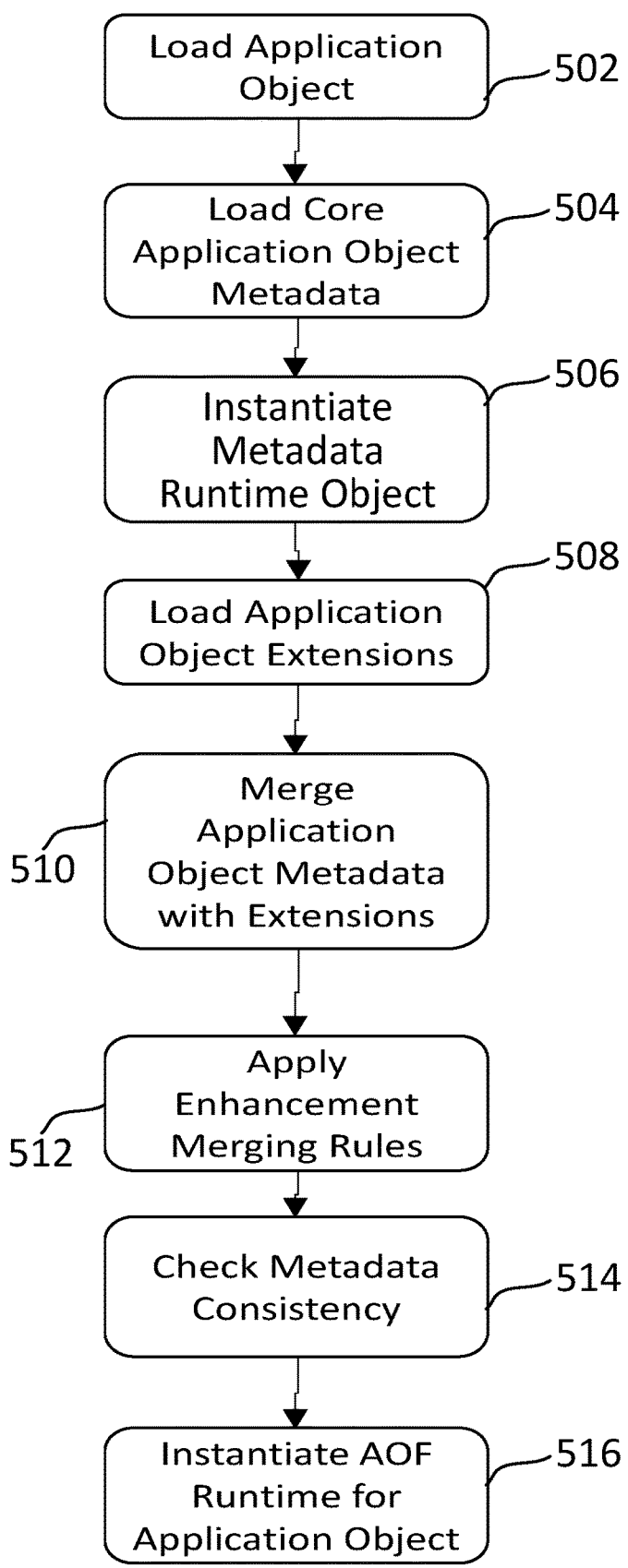
FIG. 5 is a flowchart illustrating example runtime operations of the system of FIG. 3.

FIG. 5 is a flowchart illustrating example runtime operations of the system of FIG. 3. In FIG. 5, a requested application object is loaded (502), and corresponding core application object metadata is also loaded (504). For example, such loading may include looking up the definition of the application object and processing the metadata of the application object. For example, the core of the application object metadata may be loaded after being derived from the application object definition. The metadata may be enhanced with information from the underlying database, such as by including table definitions, column definitions, or primary/foreign key definitions.

In FIG. 5, it is assumed that the loaded application object is marked or flagged as extensible, and, based thereon, a lookup for corresponding extension package(s) may be performed (506). Specifically, as just referenced, the customer may have added multiple extensions in an ordered layer sequence, which may then be loaded in the sequenced order.

In operation, every core package 310 is scanned when the requested application object is loaded, and if there is an application object definition and an application object extension definition with the same name in the extension package 314, then this definition is also loaded. From these definitions, and using corresponding metadata derived from the database, the extension metadata may be derived, and the core metadata may be merged with the extension metadata (510).

Enhancement merging rules may be applied (512). For example, similarly to the application object metadata, the merged metadata may also be enhanced with information from the underlying database, such as by including table definitions, column definitions, or primary/foreign key definitions.

Metadata consistency may be checked (514). For example, consistency between the application object metadata and the application object extension metadata may be checked.

Finally, an instantiated metadata runtime object may be provided (516). For example, from a point of view of the runtime processor 306 of FIG. 3, one or more runtime objects will be received from the metadata processor 308, and may be processed normally, without regard for the fact that an application object extension and associated metadata were used to create and instantiate the received runtime object(s).

Figure 6:
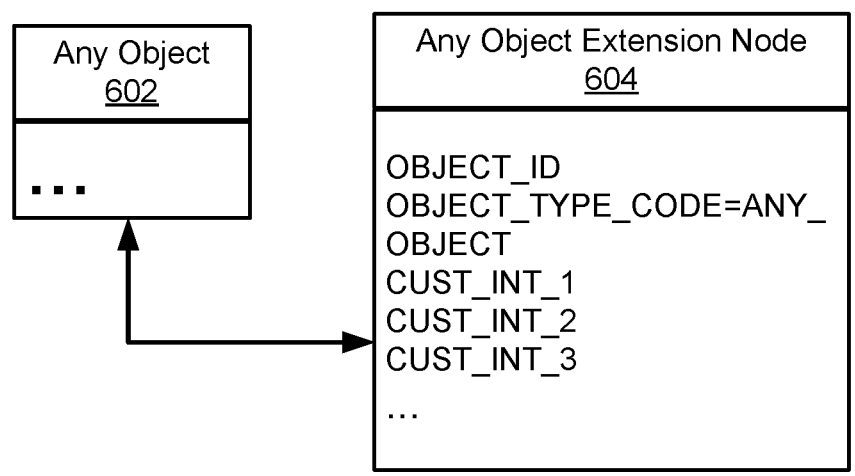
FIG. 6 is a block diagram of an application object node and associated, generic extension node.

FIG. 6 relates to more specific example implementations of the systems and methods of FIGS. 1-5. For example, in various such implementations, customers (or partners, or other users) may override aspects of application objects such as actions (such as enabledCheck, executionCheck, execute, properties, authorizationCheck, or additional custom actions), or determinations (e.g., defined for a selected event and executed following core determinations).

Other aspects of application objects that may be overridden include node/attribute aspects, such as additional consistency checks defined on node and/or attribute level(s) and executed after core consistency checks. Other aspects include readOnly (e.g., overwritten to true on node and/or attribute level), merged customer properties, and additional extension nodes and/or attributes. In other examples, attributes may be overwritten to be required (e.g., a required field), and custom properties may be merged.

In some systems, table extensibility for database tables may not be directly or natively supported. In such systems, as shown in FIG. 6, each application object 602 may be provided with a generic extension node 604. That is, for example, the generic extension node 604 may be added to each Application Object definition.

In this way, for example, application objects for which customer extension fields will be supported may be enhanced with an additional 1:1 sub-node. This node 604 may be based on a generic extension table, which can be reused for all application objects. The node 604 may contain a number of predefined attributes per type, so that each customer may decide whether to use each attribute in a desired, extended application object. In the example of FIG. 6, predefined extension fields may be included in OData (Open Data Protocol) services as sub-node(s), as well as on an OData root node, so that filtering may happen on those attributes.

The generic extension table, just referenced, may be designed to include columns for storing information data of the application object extension, and/or characterizing the application object extension. For example, the following columns may be included (in the following, all columns start with underscore (_)): _ID: Identifier of the extension node instance; _OBJECT_TYPE_CODE: Object type code of the application object that contains the extension node instance; _OBJECT_ID: Object id of the application object instance that contains the extension node instance; _INT_01 to _INT_20: Twenty integer fields for storing integer data or holding a foreign key relationship to another object instance (all IDs are integers): (DB type: INTEGER); _DOUBLE_01 to _DOUBLE_10: Ten double fields for storing double values (DB type: DOUBLE); _TEXT_01 to _TEXT_20: Twenty text fields for storing string values (DB type: NVARCHAR, length: 5000 (max)); _BOOL_01 to _BOOL_10: Ten boolean fields for storing boolean values (DB type: TINYINT); _TS_01 to _TS_10: Ten timestamp fields for storing timestamp values (CET) (DB type: TIMESTAMP); _DATE_01 to _DATE_10: Ten date fields for storing date values (DB type: DATE).

In the examples, all extension table columns may be designated as NULLABLE, because, as referenced above, the usage of the extension columns is activated on the customer side.

For example, in the re-definition file of an application object, an extension field can be enabled for an application object, providing the following minimum code (example _INT_01): this.definition={Root: {nodes: {Extension: {attributes: {_INT_01: { }}}}.}}. By this code, the extension field _INT_01 is activated for the re-defined application object and can be used for application enhancements and on the user-interface. The core functionality ensures reading and writing of the extension field value.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to at least:
    receive, from a client, a request to be delivered to an application object of an application object framework, wherein the application object includes application object data and application object metadata stored in an application object repository, wherein the application object framework includes an extension generator configured to create, based on the application object, an application object extension, wherein the application object extension includes application object extension data and application object extension metadata stored in an application object extension repository, wherein the application object further includes a node associated with one or more attributes of the application object, wherein the application object further includes a sub-node associated with a generic extension table, and wherein the generic extension table includes at least one record including an instance identifier of the application object extension, an object type code of the application object, and an object identifier of the application object;

load, in response to receiving the request, the application object and associated application object metadata from the application object repository, wherein the application object data is loaded from a first database table of the application object repository, and wherein the application object metadata is based, at least in part, on table properties of the first database table;

determine whether the application object extension exists for the application object;

load, in response to determining that the application object extension exists, the application object extension and associated application object extension metadata from the application object extension repository, wherein the application object extension data is loaded from a second database table of the application object extension repository, wherein the application object extension metadata is based, at least in part, on table properties of the second database table;

merge the application object metadata and the application object extension metadata to obtain merged metadata, wherein the merged metadata is based at least in part on the table properties of the first database table and the table properties of the second database table; and provide, based on the merged metadata, a runtime metadata object to the application object framework, wherein the runtime metadata object is configured to process the request using the application object and the application object extension.

2. The computer program product of claim 1, wherein the instructions, when executed, are further configured to load the application object and associated application object metadata including:
determining that the application object is stored with a designation of being extensible.

3. The computer program product of claim 2, wherein the instructions, when executed, are further configured to load the application object and associated application object metadata including:
determining that the application object is associated with the application object extension, based on respective names thereof.

4. The computer program product of claim 1, wherein the application object is pre-configured to include at least one extendable field, and wherein the application object extension is configured using the at least one extendable field.

5. The computer program product of claim 4, wherein the generic extension table is reused for a plurality of extendable application objects.

6. The computer program product of claim 5, wherein the generic extension table includes columns for storing data of the application object extension, and/or characterizing the application object extension.

7. The computer program product of claim 1, wherein the application object is included in a core software package, and the application object extension is included in an extension software package.

8. The computer program product of claim 7, wherein an application object definition is enhanced using related extension definitions executed in a pre-defined sequence of layers.

9. The computer program product of claim 1, wherein the merged metadata is enhanced using information from a database used to store the application object and the application object extension, including at least one of: a table definition, a column definition, a primary key definition, and a foreign key definition.

10. The computer program product of claim 1, wherein the instructions, when executed, are further configured to merge the application object metadata and the application object extension metadata including:
checking consistency between the application object metadata and the application object extension metadata.

11. A server comprising at least one processor and at least one memory including computer program code, the at least one memory and computer program code configured to, with the at least one processor, cause the server to at least:

receive, from a client, a request to be delivered to an application object of an application object framework, wherein the application object includes application object data and application object metadata stored in an application object repository, wherein the application object framework includes an extension generator configured to create, based on the application object, an application object extension, wherein the application object extension includes application object extension data and application object extension metadata stored in an application object extension repository, wherein the application object further includes a node associated with one or more attributes of the application object, wherein the application object further includes a sub-node associated with a generic extension table, and wherein the generic extension table includes at least one record including an instance identifier of the application object extension, an object type code of the application object, and an object identifier of the application object;

load, in response to receiving the request, the application object and associated application object metadata from the application object repository, wherein the application object data is loaded from a first database table of the application object repository, and wherein the application object metadata is based, at least in part, on table properties of the first database table;

determine whether the application object extension exists for the application object;

load, in response to determining that the application object extension exists, the application object extension and associated application object extension metadata from the application object extension repository, wherein the application object extension data is loaded from a second database table of the application object extension repository, and wherein the application object extension metadata is based, at least in part, on table properties of the second database table;

merge the application object metadata and the application object extension metadata to obtain merged metadata, wherein the merged metadata is based, at least in part, on the table properties of the first database table and the table properties of the second database table; and provide, based on the merged metadata, a runtime metadata object to the application object framework, wherein the runtime metadata object is configured to process the request using the application object and the application object extension.

12. The server of claim 11, wherein the application object is pre-configured to include at least one extendable field, and wherein the application object extension is configured using the at least one extendable field.

13. The server of claim 11, wherein the application object is included in a core software package, and the application object extension is included in an extension software package.

14. The server of claim 13, wherein an application object definition is enhanced using related extension definitions executed in a pre-defined sequence of layers.

15. The server of claim 11, wherein the merged metadata is enhanced using information from the database, including at least one of: a table definition, a column definition, a primary key definition, and a foreign key definition.

16. A method comprising:

receiving, at a server and from a client, a request to be delivered to an application object of an application object framework, wherein the application object includes application object data and application object metadata stored in an application object repository, wherein the application object framework includes an extension generator configured to create, based on the application object, an application object extension, wherein the application object extension includes application object extension data and application object extension metadata stored in an application object extension repository, wherein the application object further includes a node associated with one or more attributes of the application object, wherein the application object further includes a sub-node associated with a generic extension table, and wherein the generic extension table includes at least one record including an instance identifier of the application object extension, an object type code of the application object, and an object identifier of the application object;

loading, in response to receiving the request, the application object and associated application object metadata from the application object repository, wherein the application object data is loaded from a first database table of the application object repository, and wherein the application object metadata is based, at least in part, on table properties of the first database table;

determining whether the application object extension exists for the application object;

loading, in response to determining that the application object extension exists, the application object extension and associated application object extension metadata from the application object extension repository, wherein the application object extension data is loaded from a second database table of the application object extension repository, and wherein the application object extension metadata is based, at least in part, on table properties of the second database table;

merging the application object metadata and the application object extension metadata to obtain merged metadata, wherein the merged metadata is based at least in part on the table properties of the first database table and the table properties of the second database table; and providing, based on the merged metadata, a runtime metadata object to the application object framework wherein the runtime metadata object is configured to process the request using the application object and the application object extension.

17. The method of claim 16, comprising:

determining that the application object is stored with a designation of being extensible; and loading the application object and associated application object metadata, including determining that the application object is associated with the application object extension, based on respective names thereof.

18. The method of claim 16, comprising:

enhancing the merged metadata based on information from a database used to store the application object and the application object extension, the information including at least one of: a table definition, a column definition, a primary key definition, and a foreign key definition.

* * * * *